United States Patent
Reist

(10) Patent No.: US 7,628,266 B2
(45) Date of Patent: Dec. 8, 2009

(54) ROLLER DRIVE ELEMENT

(75) Inventor: Walter Reist, Hinwil (CH)

(73) Assignee: WRH Walter Reist Holding AG, Ermantingen (CH)

(*) Notice: Subject to any disclaimer, the term of this patent is extended or adjusted under 35 U.S.C. 154(b) by 368 days.

(21) Appl. No.: 11/569,221

(22) PCT Filed: May 20, 2005

(86) PCT No.: PCT/CH2005/000289

§ 371 (c)(1), (2), (4) Date: Dec. 7, 2006

(87) PCT Pub. No.: WO2005/113392

PCT Pub. Date: Dec. 1, 2005

(65) Prior Publication Data

US 2007/0267278 A1  Nov. 22, 2007

(30) Foreign Application Priority Data

May 21, 2004  (CH)  ........................ 885/04

(51) Int. Cl.
B65G 17/24  (2006.01)

(52) U.S. Cl. ........................... 198/779; 384/44

(58) Field of Classification Search ............... 198/779, 198/853; 384/43, 44, 50; 474/203, 206, 474/209

See application file for complete search history.

(56) References Cited

U.S. PATENT DOCUMENTS

| 534,442 | A | | 2/1895 | Linn | |
|---|---|---|---|---|---|
| 2,708,023 | A | * | 5/1955 | Cushman et al. | 198/779 |
| 2,734,476 | A | | 2/1956 | Marsh | |
| 2,984,522 | A | | 5/1961 | Tucker et al. | |
| 3,194,612 | A | * | 7/1965 | Striepe | 384/44 |
| 3,200,770 | A | | 8/1965 | Hendry | |
| 3,399,578 | A | | 9/1968 | Lindabury, Sr. et al. | |
| 3,410,614 | A | * | 11/1968 | Shaw, Jr. | 384/44 |

(Continued)

FOREIGN PATENT DOCUMENTS

| DE | 9404373 | 6/1994 |
|---|---|---|
| DE | 19534647 | 3/1997 |
| GB | 387403 | 2/1933 |
| GB | 403082 | 2/1975 |
| GB | 1383019 | 2/1975 |

*Primary Examiner*—James R Bidwell
(74) *Attorney, Agent, or Firm*—Rankin, Hill & Clark LLP

(57) ABSTRACT

A roller element (10) has a central body (1) and a roller unit (2). The roller unit (2) is mounted so as to circulate on a non-circular race (21) about the central body (1) and so as to be mobile with respect to the central body (1) by the rolling movement of the rollers (3) of the roller unit (2) on the central body (1). The rollers (3) are provided on the exterior of the roller unit (2) for rolling off on a rigid counter body (5). The roller element (10) is provided with a drive means (6) which engages with the roller unit (2) and drives the same in relation to the central body (1). The roller unit (2) is directly driven by engagement of the drive (6) between the rollers (3) and is pulled or pushed on the race (21) about the central body (1).

27 Claims, 11 Drawing Sheets

U.S. PATENT DOCUMENTS

Figure 1:
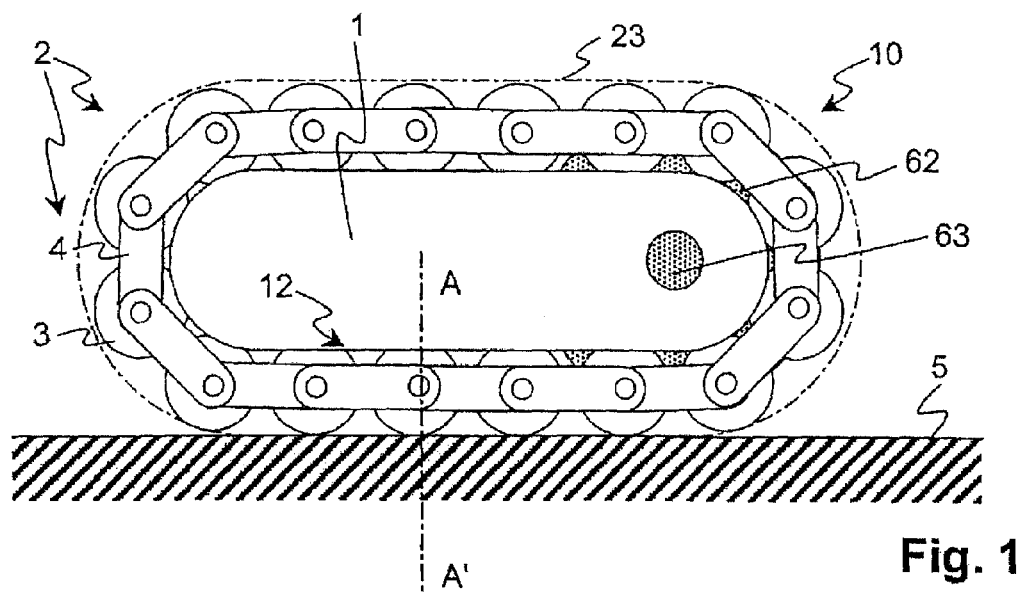

| | | | |
|---|---|---|---|
| 3,568,823 A * | 3/1971 | Rettig et al. | 198/779 |
| 4,191,431 A | 3/1980 | Roley et al. | |
| 4,561,703 A | 12/1985 | Dabringhaus | |
| 5,186,270 A | 2/1993 | West | |
| 5,190,137 A * | 3/1993 | Tas | 198/779 |
| 6,148,989 A * | 11/2000 | Ecker | 198/779 |

* cited by examiner

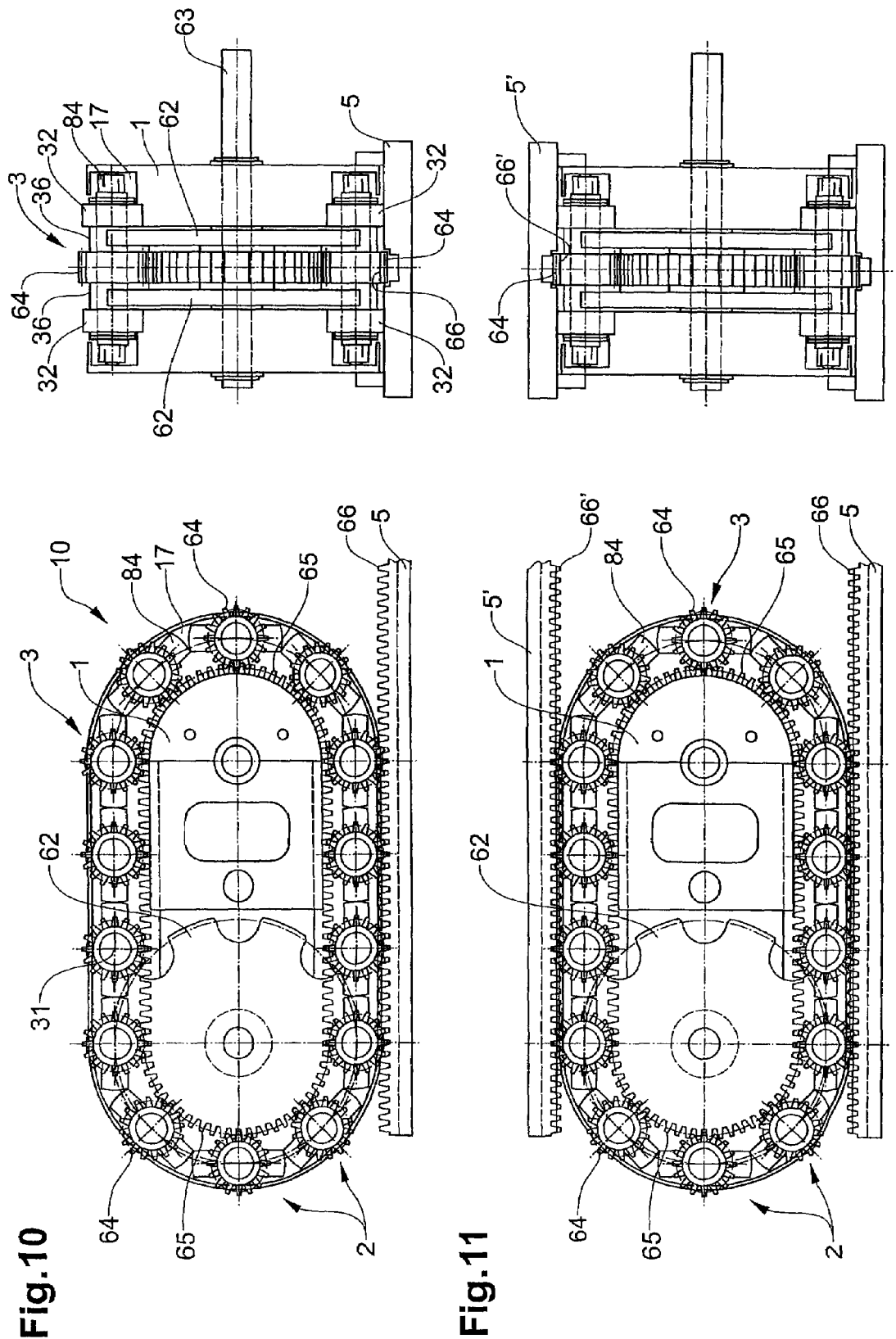

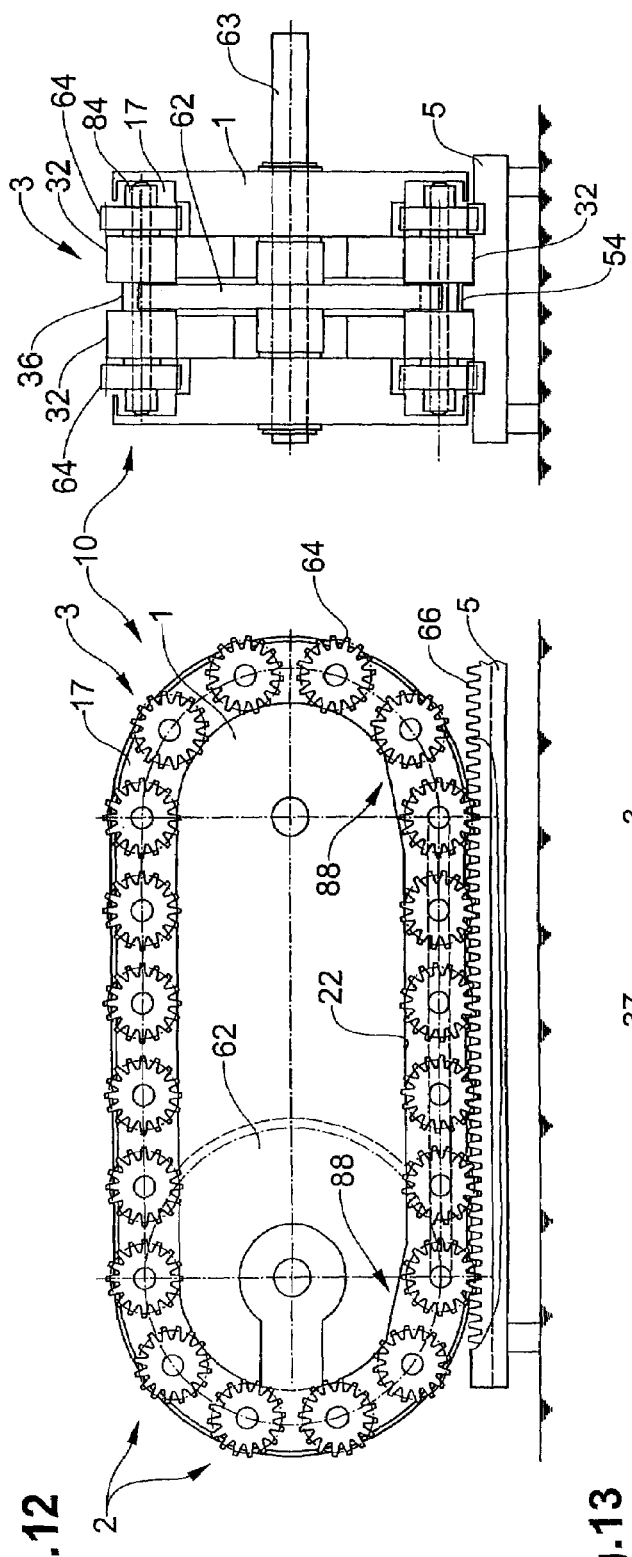
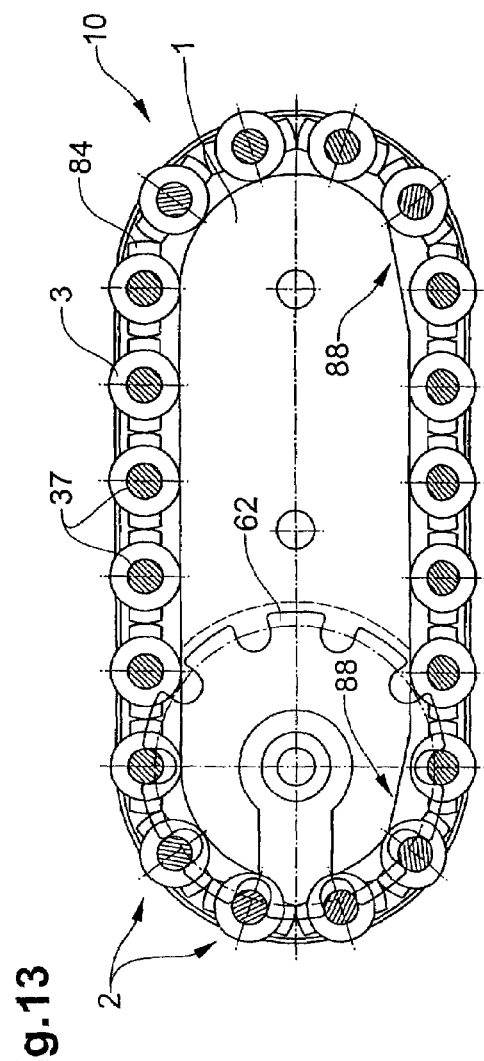
Fig.12
Fig.13

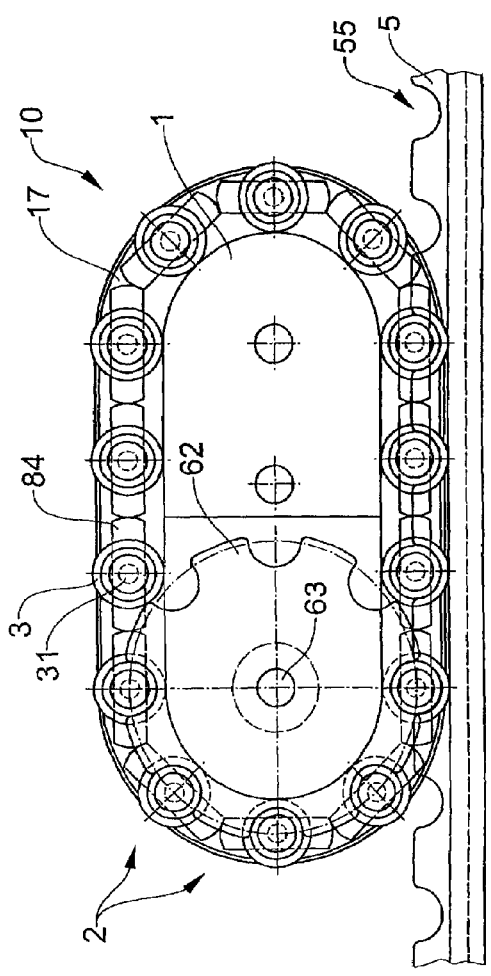
Fig.14
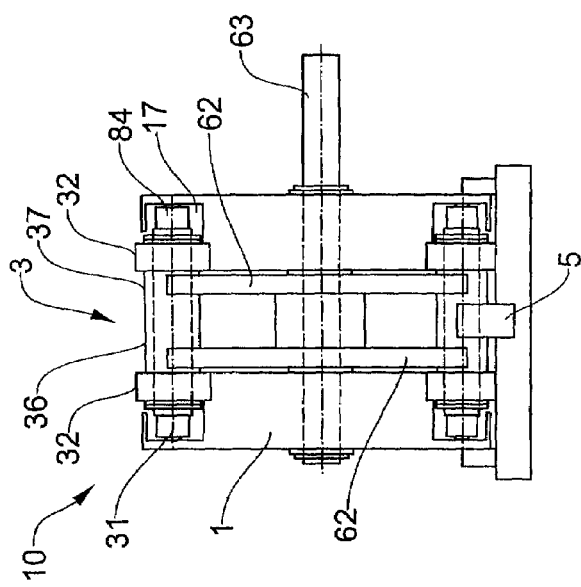
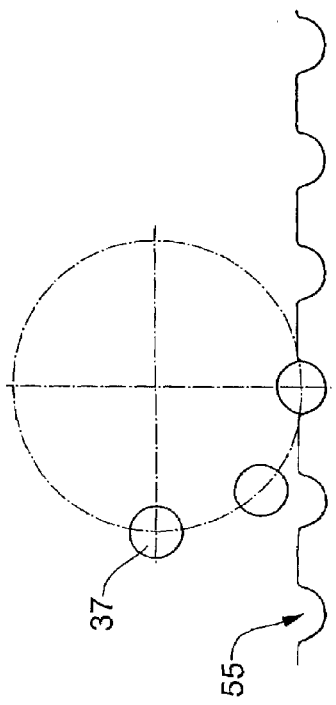
Fig.15

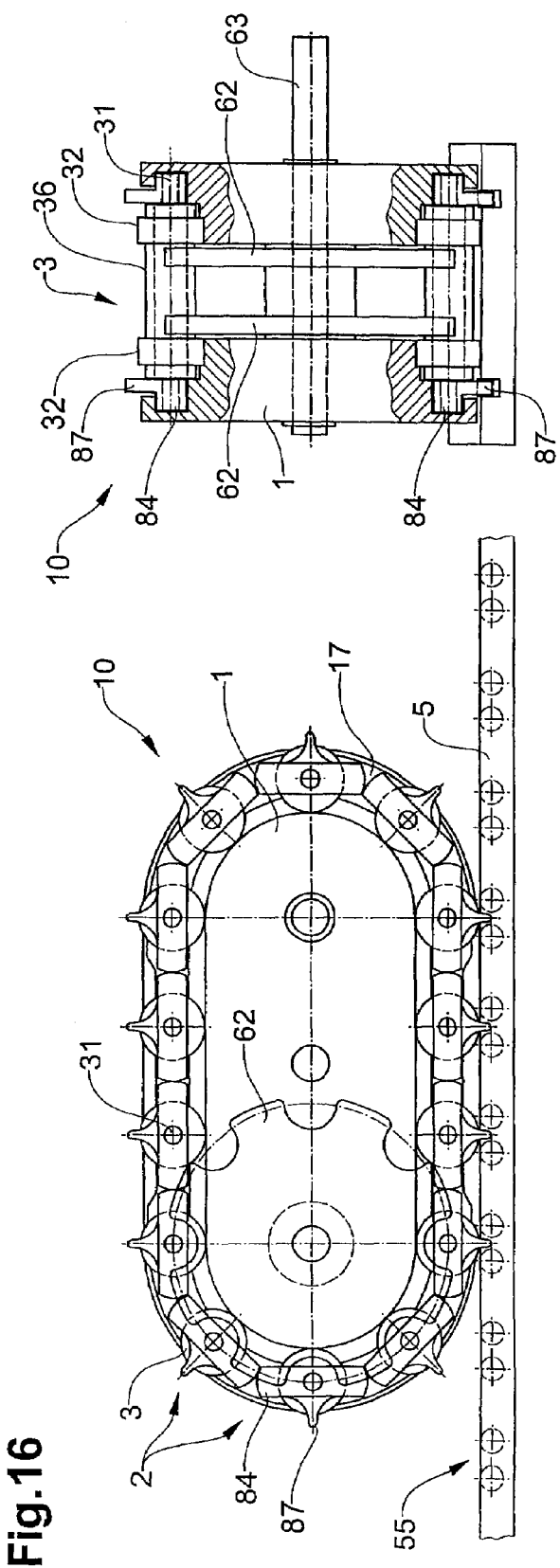
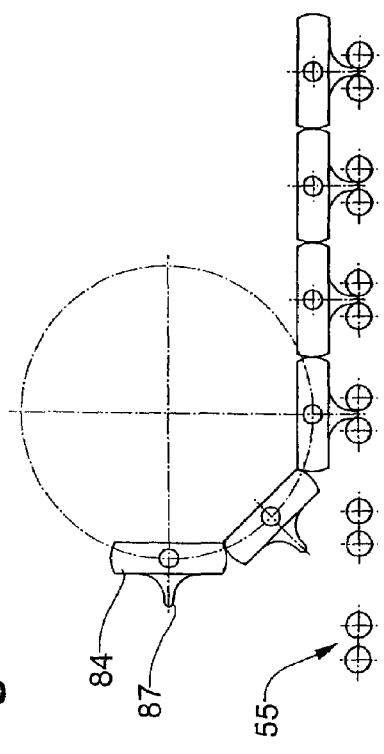
Fig.16
Fig.17

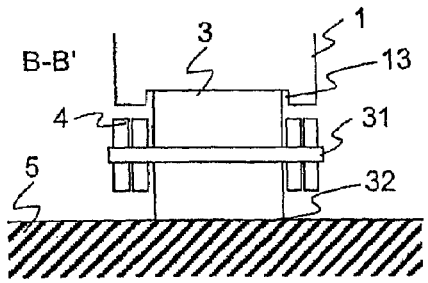
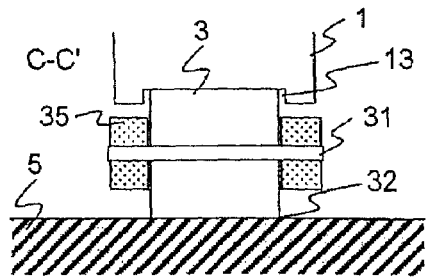
Fig. 18    Fig. 19
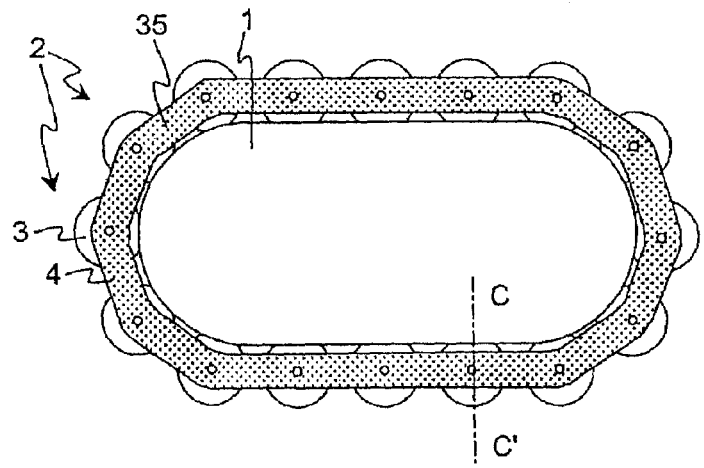
Fig. 20
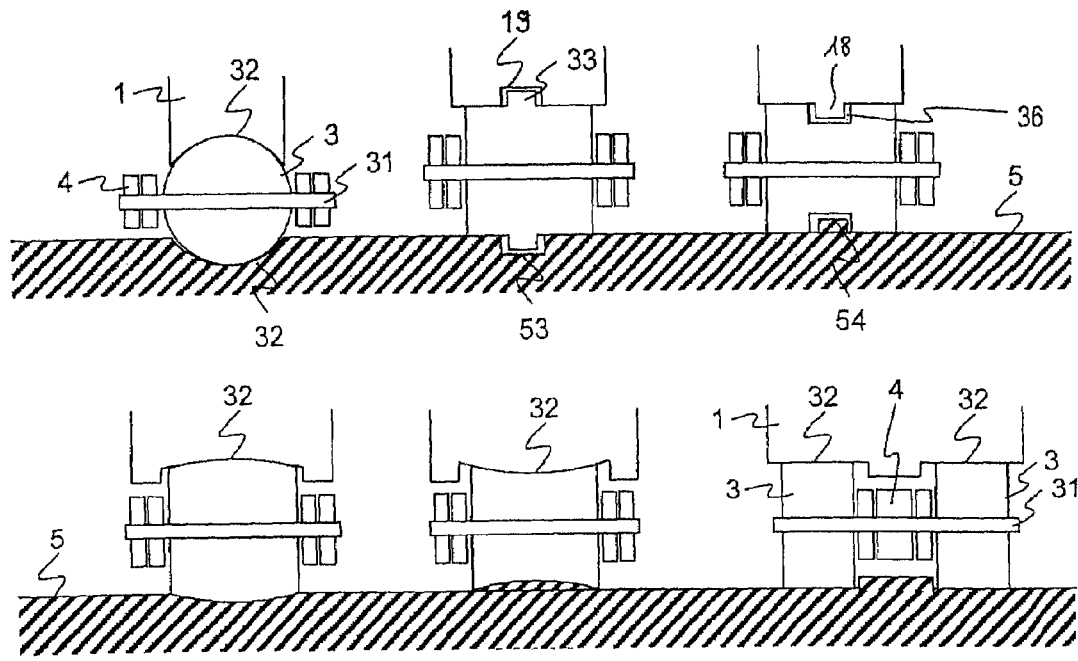
Fig. 23

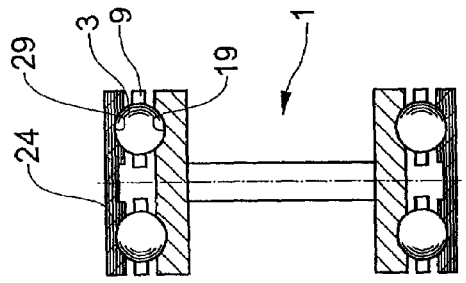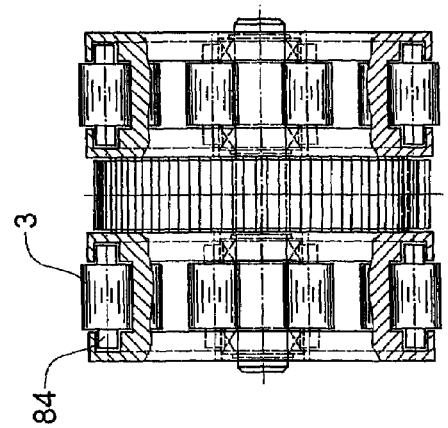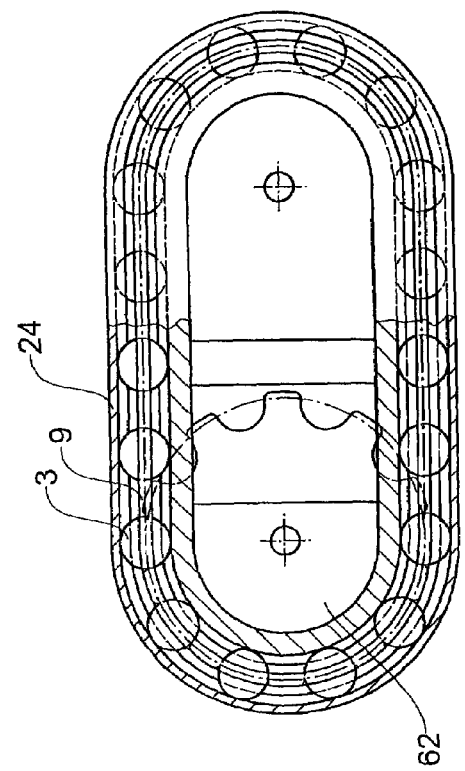
Fig.21
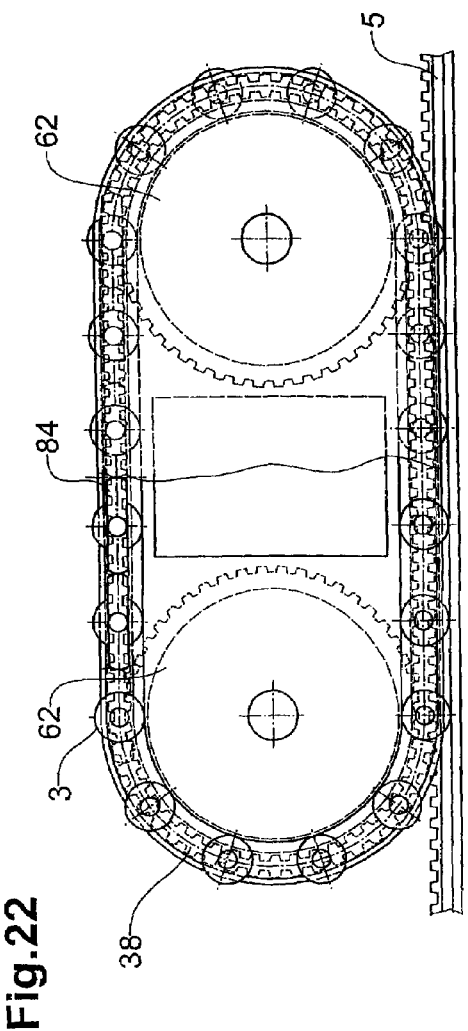
Fig.22

ROLLER DRIVE ELEMENT

The invention is situated in the field of materials handling technology and is related to a driven roller element in accordance with the generic term (preamble) of claim 1.

Embodiments derived from it are defined in the corresponding dependent claims.

In materials handling technology, among others the problem arises, that loads are to be moved with an as low as possible expenditure of force and with little friction. In addition, the design of conveying means is to be as simple as possible. For achieving a linear, rotatory or any other guided movement between bodies, wheels are utilised, which are attached to a first body and which roll on a second body. In case of high loads, the number of wheels is increased. The problem of minimising the friction, however, remains and now is transferred to the bearing support of the wheels.

In the document GB 403 082 of the year 1932 an appliance for utilisation in travellers or crane trolleys and undercarriages is divulged, in the case of which several axially connected pairs of rail wheels respectively circulate around a pair of oval rails. In doing so, the planes of the two rail ovals are parallel to one another. The axles of successive wheel pairs are coupled to one another by connecting elements or connecting springs. Every wheel pair on the one hand runs on the mentioned oval rails, and on the other hand on a stationary pair of rails or on the edges of an I-beam. The construction described, corresponding to the field of application is designed for high loads, which leads to the demonstrated choice of rails and rail wheels. For driving the arrangement an additional gearwheel is provided, which engages in a stationary toothed rack. As a result, an additional mechanical coupling between the movable and the stationary device is necessary.

GB 387 403 furthermore demonstrates creeper chains for heavy vehicles, such as mobile artillery guns. The creeper chains on individual sections of their continuous track are supported on travelling rollers. The rollers are coupled together through their axles and circulate around a central body. For moving the vehicle, the creeper chains in a zone, in which they do not travel alongside the rollers, are driven by a drive wheel.

The mentioned devices from vehicle engineering are not capable of being utilised in an efficient manner in materials handling technology, because they are designed for different requirements, in particularly for—viewed absolutely—high loads and larger dimensions. The drive calls for additional means (gearwheel and toothed rack, respectively, creeper chains with additional support bearings separated from the rollers), which make the construction a very complicated one.

It is therefore the objective of the invention to create a driven roller element, which is suitable for utilisation in materials handling technology. In particular it is to be designed in a simple way with respect to its construction. In this, in the absolute sense it is to be capable of bearing smaller loads, with respect to the materials and dimensions, however, high loads.

A roller element driven in accordance with the invention comprises a central body as well as a roller unit. The roller unit is arranged on a non-circular continuous track extending around the central body and relative to the central body as movable on the central body through the rolling-off of rollers of the roller unit on an internal side of the roller unit. The rollers on an external side of the roller unit are provided for rolling-off on a rigid counter body. The roller element comprises drive means, which engage in the roller unit and which drive it relative to the central body.

By the engaging of the driving means on the roller unit, the roller unit is directly driven and pulled or pushed around the central body on the continuous track. At least at those points, at which the central body burdens the rollers relative to the central body, the rollers roll-off on the central body and by this on their other side drive the roller element forward as a whole relative to the central body.

Through the direct driving of the roller unit, a drive without further mechanical couplings with the counter body is possible. The design is simple and robust and it is possible to implement it with relatively loose—or loosely connected components.

Driving of the rollers by rotation of the rollers is in principle also possible, however, technically difficult to implement. In preference therefore the roller unit as a whole is driven relative to the central body by cams or teeth, which engage in the rollers and/or in other parts of the roller unit. The drive thus comprises protruding elements, which are designed for engaging in corresponding elements of the roller unit and with this for driving the roller unit relative to the central body.

During the engaging in the rollers the protruding drive elements, for example, engage between rollers, which are roller-shaped and with spacing between one another, similar to as in the case of a roller chain. Or else the rollers are arranged closer to one another, and respectively are provided with a groove extending in the circulating direction and as a result designed for receiving the protruding drive elements.

During the engaging in other parts of the roller unit, other parts of this kind are in preference driver elements of the bearing shafts, which are designed as protruding in axial direction and as corresponding to the cams. If the bearing shafts are connected with chain link plates, it is also possible that the driver elements are formed on these chain link plates.

In a preferred embodiment of the invention, the drive is formed by at least one gear wheel arranged inside the roller unit. Its teeth in preference engage in the space between the rollers, respectively, in the grooves of the rollers.

In a preferred embodiment of the invention the drive is formed by a chain of driving cams, which engage in the roller units from inside or from outside and drive it. In preference, in doing so the driving cams from time to time are not in engagement with the roller unit and controlled by a radial cam are brought into engagement temporarily with the roller unit in a predefined zone relative to the central body.

The rollers in preference are designed as balls or spheres or essentially as roller-shaped (barrel-shaped). Because of the simple shape of the rollers, it is possible to implement the roller element and the counter body in a mechanically simple manner. The rollers are capable of being reliably guided with simple means, for example, in a continuous groove in the central body. This is able to take place with relatively high tolerances, therefore with loosely connected elements. Through a roller shape or drum shape, therefore an essentially cylindrical shape or a cylinder shape bulging outwards or a cylinder shape bulging inwards, a load pressure is distributed over a contact line between the roller and the counter body. Because of the non-circular continuous track, it is possible to adapt the shape of the central body and with this of the continuous track to a shape of the counter body, and as a result a load pressure is able to be distributed over several rollers. Because of the roller shape, simultaneously a simple guiding of the roller unit, for example, on a rail is possible.

In preference the roller unit comprises means for achieving a constant spacing between the rollers. By this it is prevented, that successive rollers come into mutual contact, as a result of which friction losses possibly would be produced. It is possible, for example, to implement the means, in that the rollers are connected together in a chain-like manner, similar to in a roller chain. In contrast to a roller chain, however, the rollers in accordance with the invention protrude beyond the connecting links of the chain, and between the rollers there is not imperatively a space, such as is absolutely necessary in case of a roller chain for receiving the teeth of a gear wheel.

In a preferred embodiment of the invention, the means for achieving a constant distance between the rollers is at least a flexible bearing strip, which connects the bearing shafts of the rollers to one another. Through this the construction of the roller unit is simplified in comparison with a chain-like connection of the rollers. In preference, it is possible to utilise two bearing strips with rollers located in between, or else a bearing strip between two rows of rollers. In principle also arrangements with several rows of rollers and roller strips, and/or asymmetrical arrangements are possible. The bearing strip at least on its inside is able to be designed as a synchronous or toothed belt, which engages in a correspondingly designed toothing of a gear wheel.

In another preferred embodiment of the invention, rotation axes of the rollers are supported as rotatable in spacer bodies arranged laterally to the rollers. The spacer bodies or spacers in preference are hard and stiff, this means essentially not flexible and are loosely inserted and not chained together. In the direction of the continuous track the spacer bodies extend further than the rollers. Thus to every roller a pair of spacer bodies is allocated, which are connected with the rollers through the roller shaft and capable of rotating, travel along with the roller, and which keep the rollers at a distance from one another. Therefore solely a pushing, not, however, a pulling of a succession of rollers is possible.

With this a minimum spacing between the rollers is assured, so that the rollers do not come into contact with one another. A maximum spacing is not assured by the spacer bodies themselves. Only in combination with all other rollers of the roller unit and by the restriction by means of a conveying track, in which the rollers run, is a maximum spacing also assured.

The spacer bodies together with the rollers run around the central body in a conveying track. The conveying track partially encircles the spacer bodies, so that they are not able to fall out in radial direction. It is possible that the spacer bodies on both sides of a roller are plugged on to protruding short axle stubs connected rigidly with the roller, or else the spacer bodies are connected rigidly with an axle of the rollers, wherein the roller is arranged as rotatable around this axle.

Between the spacer bodies and the rollers, as well as between the spacer bodies and the conveying track, in preference significant play is present. As a result, the parts are easily movable against one another, and it is possible to manufacture them cost-effectively and to install them in a simple manner.

In principle the roller units are also capable of being guided and kept at a distance from one another by external bearing shells. These are formed out of a construction of individual bearing shells connected together in an articulated or flexible manner and they form a movable bearing cage, which in the following is also referred to as a cage belt. In this, the cage belt in a preferred embodiment of the invention is bendable in at least two directions and in preference also capable of being twisted. Therefore it is not only capable of moving in a flat continuous track, but also along a track, which extends in a curved surface. With this, it is possible to equip roller units, which follow a curved, in particular a circular track around a centre of a circle, which is at a distance from the roller element in the direction of the roller axes. In correspondence with the capability of the cage belt to be twisted, also more complicated, for example, screw-shaped track forms are possible.

In a preferred embodiment of the invention, between the central body and the counter body a runner belt or a creeper chain belt is arranged, which encircles the roller unit over its complete circumference, so that the roller elements rolls-off on a counter body over the runner belt. With this, any unevenness in the counter body is compensated and by the utilisation of suitable materials for the belt an adhesion between the roller unit and the counter body is capable of being increased.

In a further preferred embodiment of the invention, the counter body does not travel along with the roller element. For example, it is possible that it is a guide rail or a body with a guide groove, or else simply a flat surface. A loading of the central body in the direction of this surface is transmitted directly through the rollers. A possible bearing support of the rollers in doing so it not significantly loaded. These roller bearings therefore are able to be implemented in the simplest manner as plain bearings. As a result, the overall construction becomes very simple.

Typically the counter body is a stationary support or a guide rail. Vice versa, however, it is also possible that the roller element is stationarily fixed relative to the surroundings and that the counter body is moving.

In a further preferred embodiment of the invention, the roller unit is foreseen for rolling-off on a further body, wherein the roller unit and the further body comprise correspondingly shaped and interlocking means for the positive interlocking force transmission.

In a further preferred embodiment of the invention, the rollers are essentially cylindrical and equipped with a gear wheel profile, respectively, a gearing. The surfaces on the further body located opposite the gearing respectively comprise a corresponding gearing. Because of this, with a driven roller unit the transmission of high propulsion forces on to a runner belt or on to the counter body become possible. It is also possible, that the central body itself comprises a gearing, over which the gearing of the rollers at least partially rolls-off along the circumference of the central body.

Instead of or in addition to a gearing of the rollers for the force transmission on to the counter bodies, also the lateral spacer bodies or a cage belt are able to comprise radially protruding drivers, which are foreseen for engaging in the engagement openings of the further body.

One drive unit in accordance with the invention comprises a driven roller element and a correspondingly shaped counter body. The design of the geometry and of the kinematics of roller element and counter body makes a positive interlocking transmission of force possible.

In this, the counter body preferentially is designed as a toothed rack, which along its linear main direction of expanse comprises deepened engagement openings or a toothed profile. The engagement openings, for example, serve for receiving the rollers or the roller axles during the rolling-off of the roller element on the counter body, or for the engaging of drivers, which are attached to the lateral spacer bodies. In both instances a positive interlocking connection between the roller element and the counter body is produced, which renders mutual sliding off in the linear main direction of expanse, respectively, in the direction of movement impossible.

In a further preferred embodiment of the invention, a further counter body is present, which relative to the roller element is arranged opposite the counter body a which also comprises means shaped in correspondence with the roller for the positive interlocking force transmission. The circulating roller unit therefore engages in the counter body, respectively, in the further counter body on both sides of the roller element and in this way is capable of supporting and driving one relative to the other.

In a particular embodiment of the invention, it is possible that the counter body and the further counter body also comprise circular cylindrical, concentric surfaces and form a ring-shaped bearing. In doing do, the central body of the roller element on a first side comprises a circular arc-shaped track section, and on a second side located opposite the first side a second circular arc-shaped track section, wherein the two circular arc-shaped track sections are concentric. At least three roller elements are arranged between two bodies to be bearing supported against one another, which roll-off against one another over the roller elements and which are capable of being driven.

If one makes do without the mentioned means for spacing, then it is possible to implement the invention in a particularly simple manner. In doing so, in general it is accepted, that the rollers come into contact with one another and rub against each other. In a preferred embodiment of the invention, this rubbing against each other is prevented in a section of the continuous track, in which the rollers are under load. This takes place, in that by the design of the continuous track and/or guide-way on the central body care is taken, that the rollers then respectively have spacing, when they enter into this section. As soon as the rollers are in the section under load, their spacing is defined by the both-sided rolling-off movement and it remains constant. If the rollers are implemented as barrel-shaped or as balls or spheres, then the friction-, respectively, rubbing surface between rollers is reduced.

During the rolling-off of the central body on the rollers and of the rollers again on the further body, the roller unit moves around the central body on a continuous track. In doing so, the rollers in preference travel in a guide-way of the central body, for example, in a continuous groove. This guide-way defines a position of the rollers in their axial direction.

The shape of the continuous track in preference is an oval with semi-circular end sections, which are connected by an upper and a lower straight section. The lower straight section faces the further body. The other sections do not imperatively have to be formed by the described semi-circles and the straight, it is sufficient that they permit a low loss returning of the roller unit onto itself. In further preferred embodiments of the invention, as already mentioned above, instead of the straight sections segments of a circle with a common centre point are present.

In a preferred embodiment of the invention the roller respectively comprises a guide element. This is formed by an incision or by a standing-out part of the roller, for example by a continuous channel, respectively, groove in the direction of rotation of the roller, or else by a bulge, respectively, rib on the roller. In preference, together with a channel or groove of the roller in correspondence a continuous bulge or a bridge is formed in the central body, or vice versa with a rib of a roller a groove on the central body. Depending on how the roller element is inserted, it is also possible that a corresponding guide is formed in the further body.

The rollers comprise an essentially rotation-cylindrical shape. In preference, they are essentially cylindrical with a constant diameter, or else bomb-shaped respectively, bulging outwards or, however, also designed with a ball—or spherical shape. Also in case of these shapes it is possible, that the shape of the continuous track on the central body and/or the shape of the further body is correspondingly shaped.

The individual components of the roller elements are able to be manufactured with comparatively large tolerances and therefore cost-effectively, without the serviceability being reduced by this. The rollers are in preference made as a single piece and out of a hard plastic material.

The roller element is able to be considered as an oval roller—or ball bearing, with the advantage, that a load is distributed over several rollers and that it is possible to manufacture the arrangement as overall more capable of bearing loads than conventional bearings with similar dimensions.

The roller element in accordance with the invention furthermore in principle is capable of being utilised wherever up until now wheels roll-off on flat or regular curved surfaces. Thus an individual roller element is able to travel guided on a rail and equipped with a holding device for an article to be transported, for example, a clasp. Or else it is possible for several roller units to be arranged on a vehicle in place of conventional wheels. A length of the central body, for example, lies within a range of between 2 cm and 20 cm up to 50 cm, and a roller diameter in a range of between 4 mm and 10 cm.

In a preferred embodiment of the invention, the roller unit in itself and/or in its mobility relative to the central body comprises play. Through a simple shape of the rollers in conjunction with the permissible play, on the one hand it is possible to implement a simple with respect to its design guiding of the roller unit around the central body, and on the other hand a cost-effective manufacturing in particular of the roller unit becomes possible. The roller unit therefore is able to consist of loosely connected elements and, for example, be reliably guided in a continuous groove in the central body. In contrast to prior art, the play is not eliminated by means of springs, but admitted or even enlarged and combined with a correspondingly robust or tolerant guide-way. The roller element therefore does not comprise any further elements, which are in a position to pull the roller unit to the central body or to hold it there.

The play of the roller unit relative to the central body in preference is so large, that the roller unit at one point is capable of being lifted off the central body by at least ⅕ or ½ a roller diameter. Depending on the dimensions of a guide-way of the roller unit, it is also possible to tolerate a lifting off by up to a whole roller diameter, solely, however so far—taking into account the play of the roller unit as a whole in lateral, respectively, in axial direction—that the rollers are not capable of leaving the guide-way laterally.

In another formulation, the play is also able to be quantified by the statement that a length of the roller unit is greater by at least 2% to 5% than the length of a roller unit sitting close without any play.

Further preferred embodiments follow from the dependent claims.

In the Swiss patent application, respectively, international patent application CH 2004 0884/04 with the same priority day, respectively, day of application, further details of the described roller elements and further embodiments of roller elements are described. The content of these two applications is taken over into the present application by reference. Over and above the described combinations, it is possible to combine the demonstrated characteristics of roller elements and their drives in many and diverse ways.

Figure 2:
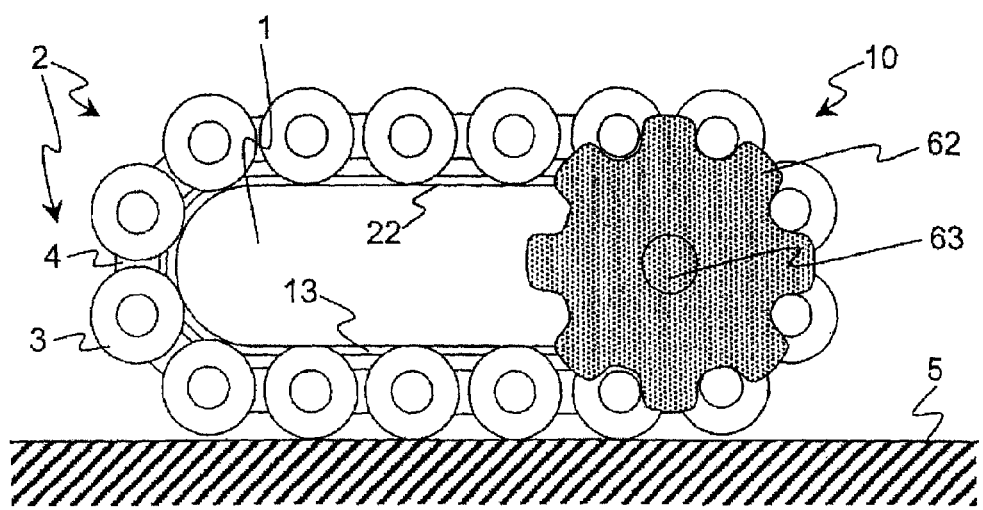
Figure 3:
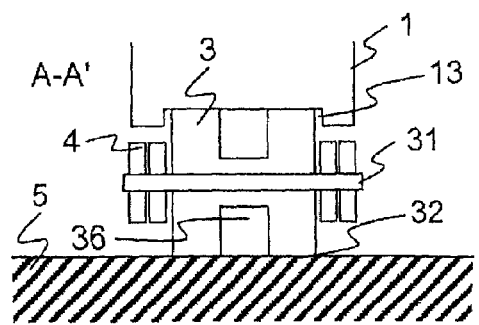
Figure 4:
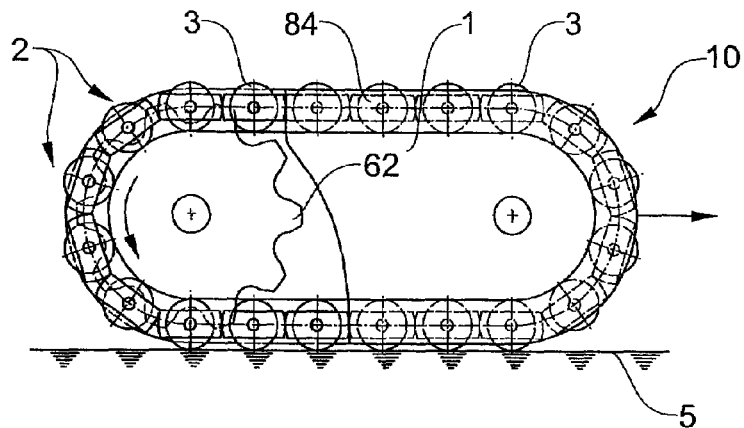
Figure 5:
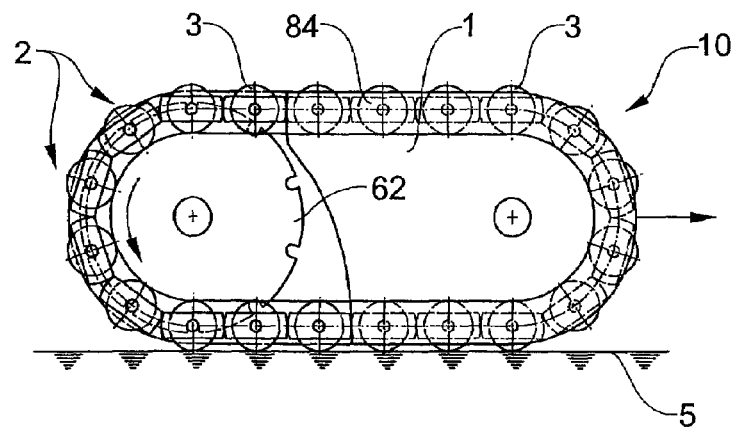
Figure 6:
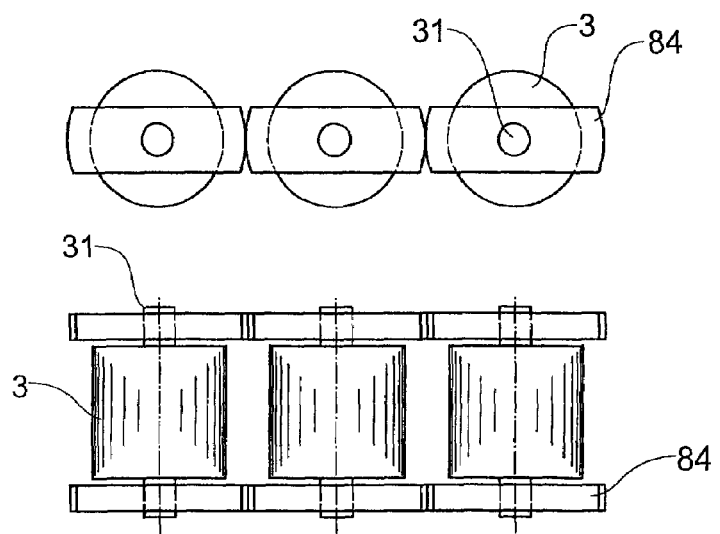
Figure 7:
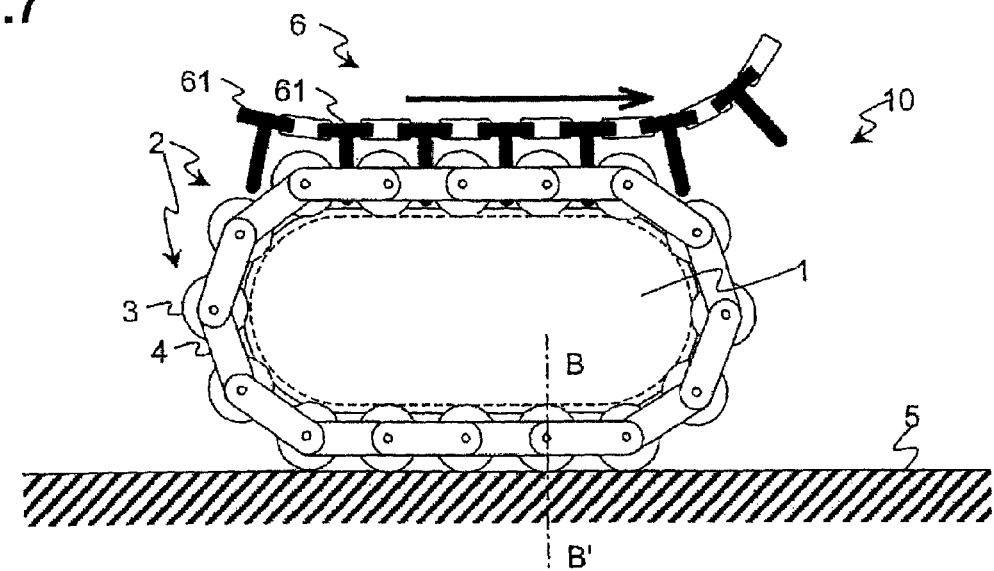
Figure 8:
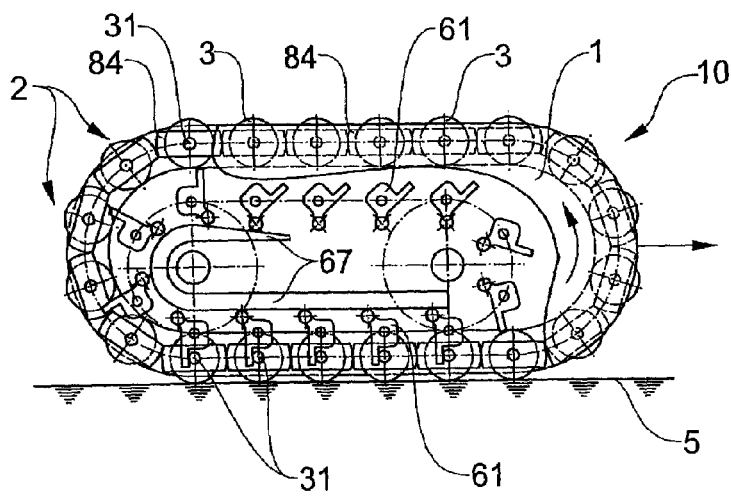
Figure 9:
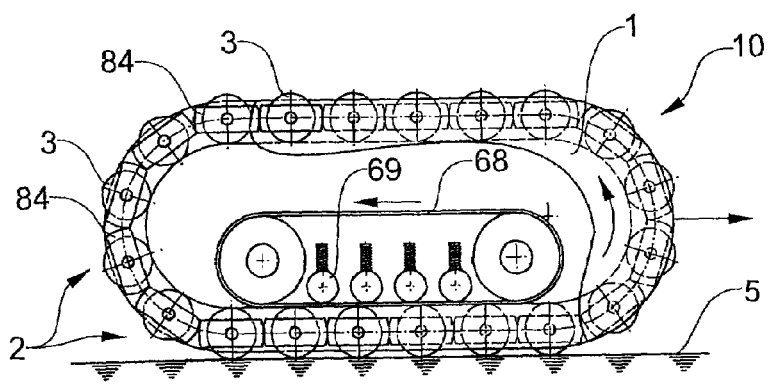
Figure 24:
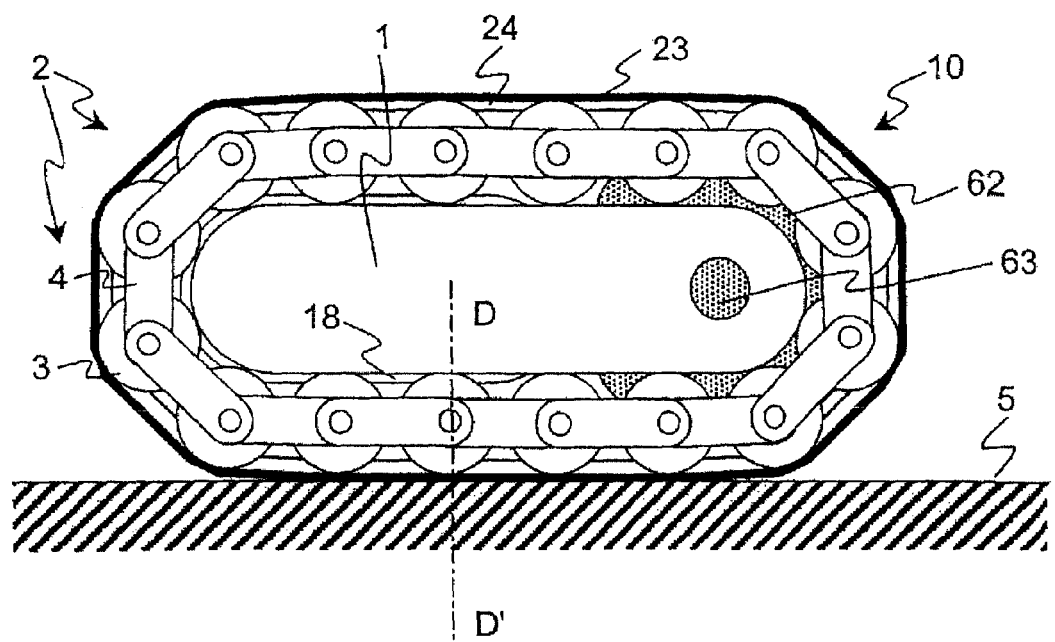
Figure 25:
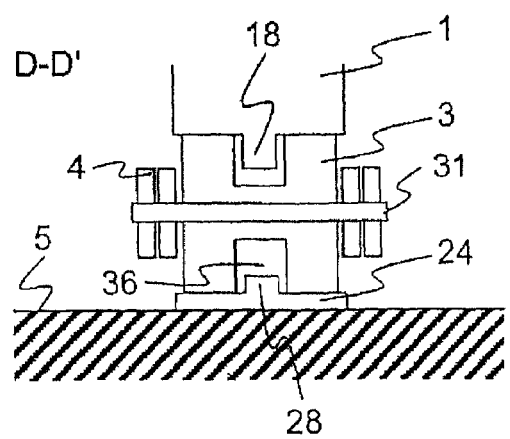
Figure 26:
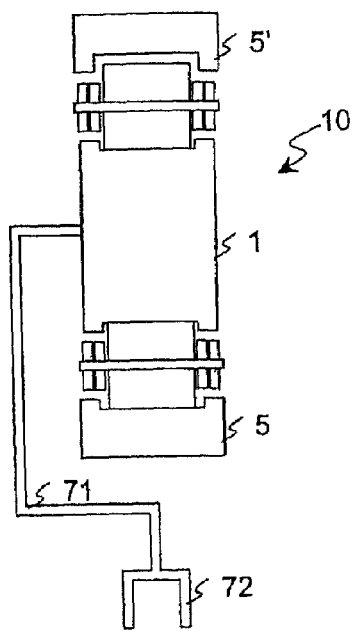
Figure 27:
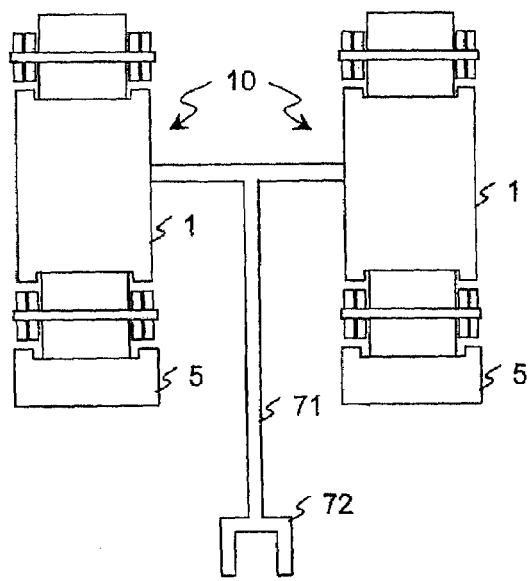

In the following, the object of the invention is described in more detail on the basis of preferred examples of embodiments, which are illustrated in the attached drawings. These respectively schematically depict:

FIG. 1 a side view of a roller element with drive in accordance with a preferred embodiment of the invention;

FIG. 2 a longitudinal section through a roller element according to FIG. 1;

FIG. 3 a cross section through a part of a roller element from the view according to FIG. 1;

FIGS. 4 and 5 roller elements with spacer bodies;

FIG. 6 individual rollers with spacer bodies;

FIGS. 7 to 9 roller elements with drive in accordance with further preferred embodiments of the invention;

FIGS. 10 to 13 roller elements with toothed contact zones;

FIGS. 14 and 15 a further roller element with a positive interlocking force transmission through the rollers;

FIGS. 16 and 17 a roller element with positive interlocking force transmission through the spacer bodies;

FIG. 18 a cross section through a part of a roller element from the view according to FIG. 7;

FIG. 19 a cross section through a part of a roller element with a belt for spacing the rollers;

FIG. 20 a side view of a roller element according to FIG. 19;

FIG. 21 a roller element with a drive through a belt;

FIG. 22 a roller element with a drive as a synchronous belt;

FIG. 23 different shapes of rollers;

FIG. 24 a side view of a roller element with a runner belt;

FIG. 25 a cross section through a part of a roller element from the view according to FIG. 24;

FIGS. 26 and 27 embodiments of the invention in conjunction with a gripper; and

Figure 28:
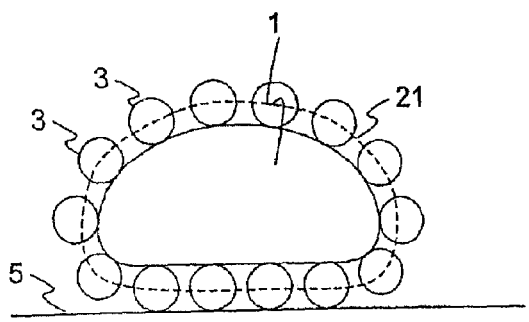
Figure 29:
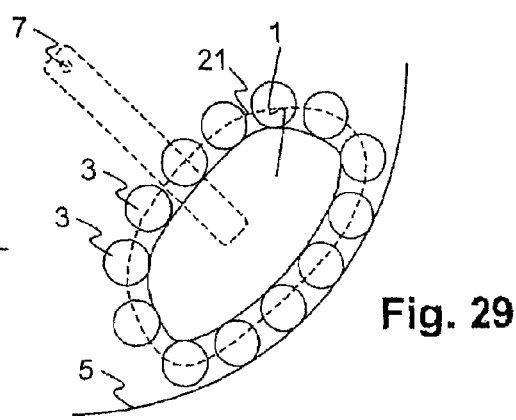

FIGS. 28 and 29 further embodiments of the invention.

The reference marks utilised in the drawings and their significance are listed in summary in the list of reference marks. On principle, in the Figures the same parts are indicated with the same reference marks.

FIG. 1 schematically illustrates a side view of and FIG. 2 schematically illustrates a longitudinal section through a roller element 10 in accordance with a preferred embodiment of the invention. The roller element 10 comprises a central body 1 and a roller unit 2 circulating around it. The roller unit 2 consists of a plurality of rollers 3, the bearing shafts 31 of which are connected together through chain link plates 4.

The chain link plates 4 together with the rollers 3 form a roller chain. The diameters of the rollers in doing so are so large relative to the chain link plates 4, that the rollers 3 relative to the chain link plates 4 both inwards and outwards protrude over the chain link plates 4 in radial direction. With this, an internal side 22 of the totality of the rollers 3 forms an internal side 22 of the roller unit 2. Correspondingly, an external side of the totality of the rollers 3 forms an external side 23 of the roller unit 2. This internal side 22 and external side 23 are imagined units, the external side 23 in FIG. 1 is indicated with dashed lines. On the internal side 22 the rollers 3 are able to roll-off on the central body 1, on the external side 23 on a further body, in the following referred to as counter body 5. When the side of the central body 1, which is facing the counter body 5, comprises a shape corresponding to the shape of the counter body, then a load on the central body 1 in the direction of the counter body 5 is distributed over several rollers 3. Illustrated here is a counter body 5 and in correspondence a straight section 12 of the central body 1. In case of a displacement of the central body 1 in the plane of the drawing parallel to the counter body 5, the central body 1 rolls-off on the counter body 5 over the rollers 3. In doing so, the roller unit 2 travels around the central body 1 in a continuous track 21.

For driving the roller unit 2, the roller element 10 comprises a chain wheel or gear wheel 62, which from the inside engages in the roller unit 2 between the rollers 3. For receiving teeth of the gear wheel the rollers 3 respectively comprise a groove or a slit extending in circumferential direction, they therefore have an H-shaped cross section. The gear wheel 62 is driven through a drive shaft 63, which in axial direction protrudes out of the roller element 10 in one or in both directions and which is capable of being set in motion by a not depicted drive.

FIG. 3 illustrates a cross section A-A' through a part of a roller element according to FIG. 1 or 2. It becomes visible how the rollers 3 extend in a guide groove 13 of the central body 1 and by it are held in axial direction. The guide groove 13 extends around the continuous track 21 of the roller unit 2 either in sections or completely.

The FIGS. 4 and 5 illustrate roller elements 10, the roller units 2 of which comprise lateral spacer bodies 84 for spacing the rollers 3. In FIG. 6, for illustration a short succession of rollers 3 with lateral spacer bodies 84 belonging to them are depicted without further elements of a roller element 10. The spacer bodies 84 are essentially shaped as cuboids and in the centre of one of the lateral surfaces comprise a bore for loosely receiving a bearing shaft 31 of a roller 3. This lateral surface in one direction is longer than the roller diameter, and in the other direction is shorter than the roller diameter. The spacer bodies 84 therefore in travelling direction are larger than the roller diameter, as a result of which the rollers 3 are kept spaced apart. The ends of the spacer bodies 84 pushed together in preference are cylinder segment surfaces, wherein their cylinder axis coincides with the bearing shaft 31. As a result, the ends of successive spacer bodies 84 are able to roll-off against one another. This in particular in the case of changes of direction makes an easy movement of the roller unit 2 possible. The spacer bodies 84 are plugged on to short axle stubs or bearing shafts 31 of the rollers 3. The bearing shafts 31 and the spacer bodies 84 in preference comprise a large play, so that the bearing shafts 31 rotate loosely in the spacer bodies 84. It is therefore possible to manufacture them cost-effectively with large tolerances.

According to FIG. 5, the gear wheel 62 engages in the rollers 3 at a central guide groove 36. According to FIG. 6, the gear wheel 62 comprises two partial gear wheels arranged in parallel, which respectively engage in the bearing shafts 31 on both sides of the roller 3. Correspondingly, the engaging recesses on the gear wheel 62 of the FIG. 6 are smaller than those of the FIG. 5. Seen this way, the gear wheel 62 is also able to be considered as a cylinder with several semi-circular recesses in radial direction.

As visible in the cross sections of the FIGS. 10 to 16, the lateral spacer bodies 84 are partially encircled by the conveying track 17, and therefore are retained in radial direction, respectively, prevented from falling out. Also here in preference a large play is present.

FIG. 7 illustrates a side view of a roller element with a drive 6 in accordance with a further preferred embodiment of the invention. The drive 6 comprises several drive cams 61, teeth or drivers, which are connected together in a chain-like manner. The chain is only depicted as a section and it is set in motion by not depicted drive means. The drive cams 61 moved in the direction of the arrow engage in the roller unit 2 and cause a movement of the roller unit 2 around the central body 1. This movement in turn leads to a movement of the central body 1 relative to the counter body 5, also in the direction of the arrow, however, with half the speed of the drive cams 61 relative to the counter body 5.

FIG. 8 schematically illustrates a roller element 10 with a chain of circulating drive cams 61, which are arranged inside the central body 1 and engage in the roller unit 2 from the inside. A belt or a chain for connecting and for driving the drive cams 61 is only schematically indicated as a line. The drive cams 61 extend in a first section, without engaging in the roller unit 2, and by a radial cam 67 in a second section are brought into engagement with the roller unit 2. In doing so, the drive cams are arranged in such a manner, that they engage in the bearing shafts 31 of the rollers 3 and through this drive them. Alternatively, however, it is also possible that they engage in the rollers 3 themselves or in the spacer bodies 84.

FIG. 9 schematically illustrates a roller element 10 with a drive belt 68, which is arranged inside the central body 1 and which drives the roller unit 2 from the inside. For this purpose, the drive belt 68 along a section of the roller unit 2 by means of, for example, pressure rollers 69 is pressed against the roller unit 2. A movement of the drive belt 68 leads to a rotation of the rollers 3 and by this to a movement of the central body 1 relative to the counter body 5.

In other preferred embodiment of the invention, the drive cams 61 do not engage between the rollers 3, but rather at protruding elements of the chain link plates 4 or at the bearing shafts 31 on one or on both sides of the roller units 2. Instead of a drive chain, it is also possible to utilise one or several gear wheels as drive 6, the teeth of which engage in the roller unit 2. The drive 6, depending on the size of the roller element 10 and of the central body 1 is also able to be arranged inside the roller unit 2 and engage in it from inside.

For receiving the drive cams 61, respectively the gear wheel teeth, the rollers 3 in preference are equipped with grooves 36 or incisions extending in the direction of rotation, such as depicted, for example, in FIG. 3. Every roller 3 therefore in axial direction comprises as least one section with a larger diameter, which rolls-off on the central body 1 and on the counter body 5 or on a runner belt 24, and a section with a smaller diameter, in which the drive 6 engages. This section with a smaller diameter is also able to be separately supported and freely rotatable relative to the sections with a larger diameter. This makes the movement of the roller unit 2 in the driven zone easier.

FIG. 10 illustrates a longitudinal section through part of a roller element with toothed contact zones 64 of the rollers 3. The counter body 5 in part, apart from a rolling surface, is designed as a rack, which along its linear main direction of expanse comprises a toothing, which corresponds with the toothing 64 of the rollers 3. The toothing 64 of the rollers 3 during the rolling-off of the roller element 10 on the counter body 5 engages in the toothing 66 of the counter body 5. In the same manner, the toothing 64 of the rollers 3 during the rolling-off of the roller element 10 on the central body 1 engages in a toothing of the central body 1. Through this, among others a defined position of the rollers 3 when running-in against the toothed rack 66 results. The roller element 10 and the counter body 5 together form a drive unit.

Through the toothing in case of a driven roller element 10 it is possible to transmit high driving forces. Thus the toothed rack is able to be arranged on the counter body 5 inclined or vertically, so that the roller element 10 is capable of climbing up and—down on it. In a further embodiment of the invention, two roller elements 10 of this kind are essentially connected together rigidly and arranged between counter bodies 5 situated opposite one another.

In the cross section of FIG. 10 one is able to see, that a roller 3 comprises different sections along the axial direction. Seen from outside these are: An axle zone, in which the bearing shaft 31 lies in the spacer body 84, a rolling zone with the rolling surfaces 32. Which roll-off on the central body 1 and at times on the counter body 5, a drive zone, in which the rollers 3 comprise a groove 36 with a smaller, internal roller diameter 37, at which they are grasped by both the discs of the gear wheel 62 and transported, and in the middle a zone with the toothing 64. The toothing 64 is located in the middle of the rollers 3, because in the case of pairs of gear wheels located outside the danger of a tilting and so jamming of the teeth would be greater.

FIG. 11 illustrates a drive unit with a further counter body 5', which relative to the roller element 10 is arranged opposite the counter body 5 and which is also designed as a rack with a further toothing 66'.

FIG. 12 illustrates a cross section and a longitudinal section in the zone of the toothing 64 of the rollers 3 of a drive unit, in the case of which the central body 1 does not comprise a toothing. The rollers 3, however, comprise a rolling surface 32, which rolls-off on a flat surface of the counter body 5. The diameter of the essentially cylindrical rolling surface 32 is equal to the diameter of the rolling circle of the toothing 64 of the rollers 3, so that no speed differences occur. A loading of the roller element 10 vertical to the counter body 5 is absorbed by the rolling surfaces 32. During the driving of the roller unit 2 by the gear wheel 52 the rollers 3 by the gear wheel 62, the rollers 3 are put into circulation around the central body 1 by the spacer bodies 84 and thanks to the frictional engagement drive the roller element 10 through the rolling surfaces 32. In order to improve the frictional engagement, in preference the rolling surface 32 and/or the corresponding surface of the counter body 5 are provided with adhesion-increasing means, in that they, for example, are coated with gum or equipped with a plastic coating.

During the rolling-off of the roller element 10 on the counter body 5 the problem arises, that the toothings 64 of the rollers 3 have to come to lie in the toothing of the counter body 5 correctly. Because the orientation of the rollers 3, which are conveyed downwards in the conveying track 17, is not defined, it is possible that it happens that the teeth of the rollers 3 and of the counter body 5 jam. For this reason, the conveying track 17 at the beginning and at the end of the section, which extends along the counter body 5, comprises running-in zones or engaging zones 88. In the engaging zones 88 the rollers 3 through the movement of the roller unit 2 are already guided parallel to the counter body 5, they are, however, only pressed against the counter body 5 by the force of gravity, and not by the internal side 22 of the conveying track 17. Therefore there still are no higher loads vertical to the counter body, so that a roller 3 with its toothing 64 is able to give way and slide a little, in order to engage in the toothing 66 of the counter body 5. The internal side 22 of the conveying track 17, on which the rollers 3 roll-off on the central body 1, therefore is not completely oval, but in the engaging zones 88 rather comprises an indentation of the transition between the semi-circles and the linear section of the oval.

In the cross section of FIG. 12 the sections of a roller 3 along the axial direction are to be seen: After an axle zone the zone with the toothing 64 follows, a rolling zone with the rolling surfaces 32, and in the middle a driving zone, in which the rollers 3 are taken hold of by a single disc of the gear wheel 62 and conveyed.

FIG. 13 illustrates a longitudinal section in the zone of the driving gear wheel 62 through the roller element 10 of FIG. 12. Here the engaging of the gear wheel 62 in the groove 36 with the smaller, internal roller diameter 37 becomes visible. In order to make possible a radial movement of the rollers 3 in the engaging zone 88, the points of engagement on the gear wheel 62 are cut in more deeply than would be necessary for a purely circular movement of the rollers 3.

FIG. 14 illustrates a longitudinal section and a cross section through a drive unit, in the case of which the counter body 5 in parts is designed as a toothed rack, which along its linear main direction of expanse comprises engagement openings 55 for receiving the rollers 3, in particular in a zone of grooves 36 of the rollers 3. With this, therefore the rollers 3 during the rolling-off of the roller element 10 on the counter body 5 come to lie in the engagement opening 55. The spacing of the engagement openings 55 in the direction of the linear main direction of expanse corresponds to the spacing of the rollers 3, as it is defined by the spacer bodies 84.

In the cross section of FIG. 14 it is to be seen, that a roller 3 in a central zone of a groove 35 with an internal roller diameter 37 respectively at times on the one hand is engaged by two discs of the gear wheel 62 and on the other hand comes to lie in the engagement openings 55 of the counter body 5.

FIG. 15 schematically illustrates a circular line of movement of the internal roller diameters 37 relative to the counter body 5 with the engagement openings 55. In the drive transmission parallel to the counter body 5 those rollers 3 respectively participate, which are lying in one of the engagement openings 55.

FIG. 16 illustrates a longitudinal section and a cross section through a drive unit, in the case of which the lateral spacer bodies 84 comprise radially protruding drivers 87, which engage in engagement openings 55 of the further body 5. In analogy to the preceding embodiment of the invention, here the driving forces are transmitted by the drivers 87 instead of by the internal roller diameters 37. In both embodiments, however, the load vertical to the counter body 5 is absorbed by the rollers 3.

In the cross section of FIG. 16 one is able to see, that a roller 3 in a central zone with an inner diameter 37 at times respectively is engaged by two discs of the gear wheel 62. In place of two discs it would also be possible to utilise only a single one. The lateral spacer bodies 84, viewed in axial direction, comprise a section, which is encircled by the conveying track 17 and holds back the spacer body 84, and a section, in which the driver 87 radially protrudes beyond the edge of the conveying track 17.

FIG. 17 schematically illustrates a relative movement of spacer bodies 84 with drivers 87 relative to the engagement openings 55 of the counter body 5. Here too, several drivers 87 respectively participate in the transmission of the driving force.

FIG. 18 illustrates a cross section B-B' through a part of a roller element 10 from the view according to FIG. 7. As in FIG. 3. The rollers 3 run in a guide groove 13, because the rollers 3, however, for the engaging of the drive cams 61 have a greater spacing between one another than according to the FIGS. 1 to 3, the rollers 3 are roller-shaped (barrel-shaped) and designed without a groove.

FIG. 19 illustrates a cross section C-C' according to FIG. 20 through a part of a roller element 10 with a flexible belt or bearing belt 35 in place of chain link plates 4 for spacing the rollers. The bearing belt 35 is equipped with regularly spaced holes for receiving the bearing shafts 31. FIG. 20 illustrates a corresponding side view.

FIG. 21 illustrates a drive by means of a cage belt 9, in the case of which the gear wheel 62 engages in the cage belt 9 instead of in the rollers 3. The runner belt 24 is supported relative to the central body 1 by two cage belts 9. The cage belt 9 comprises a plurality of rollers connected to one another linearly, wherein the rollers are connected together and spaced apart from one another through a flexible and in particular also elastic connecting body. The gear wheel 62 engages in recesses of the cage belt 9 and drives it. Alternatively, it is possible that the gear wheel 62 engages in the runner belt 24 between two parallel cage belts.

In the embodiment of the invention according to FIG. 22 the central body 1 comprises two roller units 2 extending parallel to one another, between which a synchronous belt (toothed belt) 38 extends around the central body 1. The synchronous belt 38 comprises teeth both inside and outside, so that the internal side runs over two gear wheels 62, and the external side is able to engage in the counter body 5 and drives the central body 1 relative to the counter body 5 (or vice versa). A load vertical to the counter body 5 therefore is absorbed by the rollers 3, a driving force parallel to the counter body 5 is transmitted through the synchronous belt 38. Through the utilisation of a synchronous belt, the driving force is distributed over several teeth of the linear section along the counter body 5. It is possible, that analogue embodiments also comprise only one roller unit 2 or several synchronous belts 38.

FIG. 23 illustrates different shapes of rollers 3. It is therefore possible, that the rollers 3 are designed as cylinders with a constant diameter, the cylinders, however, are also capable of bulging outwards or inwards. Depending on the application, it is possible that this is advantageous. Thus, for example, the bomb-like shapes make a tilting movement of the central body relative to the counter body 5 possible.

The rollers 3 are also able to comprise guide elements 33, which correspond with corresponding groove-like guide elements 13, 53 of the central body 1 and of the counter body 5. Vice versa, the rollers 3 are also capable of comprising groove-like guide elements 36 and correspondingly the central body 1 and/or the counter body 5 bridge- or comb-like guide elements 18, 54. Through the corresponding guide elements 13, 33, 53, 18, 36, 54, respectively, through the utilisation of bomb-shaped or spherical rollers 3 it is possible to absorb lateral forces and a deviation of the movement of the roller unit 2 from the corresponding guiding direction of the guide elements is prevented.

In a further preferred embodiment of the invention, a roller 3 comprises two coaxial roller halves, which are connected through an axle. The chain links 4 for connecting the axles of adjacent rollers 3 in doing so are attached to the axle 31 between the roller halves.

In case of the embodiments illustrated in FIG. 23 and in further embodiments, it is possible that a continuous chain of chain link plates 4 respectively is replaced by a bearing belt 35. The rollers illustrated in FIG. 23 are capable of, for example, in association with a gear wheel as in the FIGS. 1, 2 and 5, respectively comprising grooves for the engagement of teeth.

FIG. 24 illustrates a side view of a roller element 10 with a runner belt 24. The runner belt 24 extends along the whole external side 23 of the roller unit 2 and surrounds it. It is possible that the runner belt 24 consists of a flexible material, such as a plastic material or rubber, as a synchronous belt, or corresponding to a creeper chain, out of a rigid material.

FIG. 25 illustrates a cross section D-D' through a part of a roller element 10 from the view according to FIG. 24. In doing so, the roller 3 comprises a continuous groove extending in the direction of rotation as guide element 36. Jutting into the groove 36 on the one hand is a guide bridge 18 of the central body 18 and on the other hand a guide bridge 28, which is formed on the runner belt 24. Furthermore, in case of a driven roller element 10 also the drive 6 is capable of engaging in the groove 36.

The FIGS. 26 and 27 schematically and in a cross section illustrate embodiments of the invention in conjunction with a gripper 72. In FIG. 26 a roller element 10 is bearing supported on one side in a counter body 5 designed as a rail and on the opposite side it is stabilised by a further counter body 5'. Attached to the roller element 10 is an arm or bracket, which carries a gripper 72. According to FIG. 27, two roller elements 10 arranged laterally offset and guided on allocated rails 5 are connected with an arm 71.

FIGS. 28 and 29 schematically illustrate further embodiments of the invention: It is not imperatively necessary, that the rollers 3 travel on an oval continuous track 21. FIG. 28 depicts an in sections straight and otherwise curved course of the continuous track 21. FIG. 29 illustrates a course without any straight sections, in the case of which a part of the continuous track 21 comprises a curve, which corresponds with a curve of the counter body 5, which forms a circular contact surface to the roller element 10. In doing so, it is possible that the roller element 10 is arranged as rotatable around a rotation axis 7 by means of a lever. Vice versa, in another embodiment of the invention, also the continuous track 21 is capable of being in sections shaped as curving inwards, so that the roller element 10 is able to roll-off outside on a surface of a regular cylinder.

LIST OF REFERENCE MARKS

1 Central body
2 Roller unit
3 Roller
4 Chain link plate
5,5' Counter body, further counter body
10 Roller element
11 Straight section
12 Guide groove
13 Bearing groove
14 Braking nose
16 Inner edge of the bearing groove
17 Conveying track
18 Guide bridge of the central body
19 Guide groove of the central member body
21 Continuous track
22 Internal side
23 External side
24 Runner belt/creeper chain
28 Guide bridge of the runner belt
29 Guide groove of the runner belt
31 Bearing shaft
32 Rolling surface
33 Guide element
34 Bearing pin
35 Bearing belt/Bearing strip
36 Guide groove on roller
37 Internal roller diameter
38 Synchronous belt
53 Guide element
54 Guide bridge on the counter body
55 Engagement opening
6 Drive
61 Drive cam
62 Gear wheel
63 Drive shaft
64 Toothing on roller
65 Tooting on central body
66, 66' Toothing on counter body, on further counter body
67 Radial cam, connecting member
68 Drive belt
69 Pressure rollers
7 Rotation axis
71 Carrying bracket/arm
72 Gripper
84 Lateral spacer body
87 Driver/pusher
88 Engaging zone
9 Cage belt

The invention claimed is:

1. A driven roller element, comprising:
a central body (1), as well as
a roller unit (2) extending around the central body (1), which roller unit (2) is arranged as extending on a non-circular continuous track around the central body (1) and movable around the central body (1) through the rolling-off of rollers (3) of the roller unit (2) on an internal side of the roller unit (2), and the rollers (3), on an external side of the roller unit (2) on one side of the central body (1), being provided for rolling-off on a rigid counter body (5),
wherein the roller element (10) comprises drive means, which engage in the roller unit (2) and drive the roller unit (2) relative to the central body (1), and
wherein the roller unit (2) is provided for rolling-off on a further body (5, 24), wherein the roller unit (2) and the further body (5) comprise means (64, 66; 37, 55; 87, 55) shaped corresponding to each other and meshing together for the positive interlocking force transmission.

2. The roller element (10) in accordance with claim 1, wherein the drive means (6) comprises protruding drive elements (61), which are designed for engaging in corresponding elements of the roller unit (2) and with this for driving the roller unit (2) relative to the central body (1).

3. The roller element (10) in accordance with claim 2, wherein the protruding drive elements (61) engage between the rollers (3).

4. The roller element (10) in accordance with claim 3, wherein the rollers (3) comprise grooves (36) extending in the circulating direction, which are designed for receiving the protruding elements (61).

5. The roller element (10) in accordance with claim 2, wherein the protruding drive elements engage in driver elements of bearing shafts (31) or in driver elements of chain link plates (4), which connect the bearing shafts 31 with one another.

6. The roller element (10) in accordance with claim 2, wherein the drive means (6) is a gear wheel (62), and several of its teeth engage in the roller unit (2) from the internal side.

7. The roller element (10) in accordance with claim 1, wherein the roller unit (2) comprises means for achieving a minimum spacing between the rollers (3), which prevent that successive rollers (3) come into contact with one another and which enable solely a pushing, not, however, a pulling of a succession of rollers (3).

8. The roller element (10) in accordance with claim 1, wherein the roller unit (2) comprises a flexible and elastic means for achieving constant spacing between the rollers (3), which connects bearing shafts (31) of the rollers (3) with one another.

9. The roller element (10) in accordance with claim 1, wherein the rollers (3) are essentially cylindrical and comprise a toothing (64), and the surfaces opposite the toothing (64) of the rollers (3) on the counter body (5), respectively, on a runner belt (24) or on a creeper chain respectively comprise a corresponding toothing (66).

10. The roller element (10) in accordance with claim 9, wherein also the surfaces opposite the toothing (64) of the rollers (3) on the central body (1) comprise a corresponding toothing (65).

11. A drive unit, comprising a roller element (10) in accordance with claim 9, and a counter body (5), wherein the roller element (10) and the counter body (5) comprise means (64, 66; 37, 55; 87, 55) shaped corresponding to each other and meshing together for the positive interlocking force transmission.

12. The drive unit in accordance with claim 11, wherein the counter body (5) is designed as a rack, which along its main direction of expanse comprises deepened engagement openings (55) for receiving the rollers (3), in particular in a section of grooves (36) of the rollers (3), and wherein the rollers (3) during the rolling-off of the roller element (10) on the counter body (5) come to lie in the engagement openings (55).

13. The drive unit in accordance with claim 11, wherein the counter body (5) is designed as a rack, which along its linear main direction of expanse comprises a toothing, which corresponds to the toothing (64) of the rollers (3) and the toothing (64) of the rollers (3) during the rolling-off of the roller element (10) on the counter body (5) engages toothing (66) of the counter body (5).

14. The drive unit in accordance with claim 11, wherein the counter body (5) is designed as a rack, which along its linear main direction of expanse comprises deepened engagement openings (55) for receiving drivers (87) of the lateral spacer bodies (84) of the roller element (10), and wherein the drivers (87) during the rolling-off of the roller element (10) on the counter body (5) engage in the engagement openings (55).

15. The drive unit in accordance with claim 11, wherein the drive unit comprises a further counter body (5'), which relative to the counter body (5) is arranged opposite the roller element (10) and which also comprises means (64, 66; 37, 55; 87, 55) shaped corresponding to the roller unit (2) and meshing for the positive interlocking force transmission on to the roller element (10).

16. The roller element (10) in accordance with claim 1, wherein the roller unit (2), and in particular lateral spacer bodies (84) or a cage belt (9), comprise radially protruding drivers (87), which are provided for the engaging in an engagement opening (55) of the further body (5).

17. The roller element (10) in accordance with claim 1, wherein the rollers (3) are formed as a single part and in preference out of plastic material.

18. The roller element (10) in accordance with claim 1, wherein the at least one central body (1) comprises means (71, 72) for the holding, at times, of articles to be conveyed.

19. The roller element (10) in accordance with claim 1, wherein the roller unit (2) in itself and/or in its movability relative to the central body (1) comprises play.

20. A driven roller element, comprising:
a central body (1), as well as
a roller unit (2) extending around the central body (1), which roller unit (2) is arranged as extending on a non-circular continuous track around the central body (1) and movable around the central body (1) through the rolling-off of rollers (3) of the roller unit (2) on an internal side of the roller unit (2), and the rollers (3), on an external side of the roller unit (2) on one side of the central body (1), being provided for rolling-off on a rigid counter body (5),
wherein the roller element (10) comprises drive means, which engage in the roller unit (2) and drive the roller unit (2) relative to the central body (1),
wherein the drive means (6) comprises protruding drive elements (61), which are designed for engaging in corresponding elements of the roller unit (2) and with this for driving the roller unit (2) relative to the central body (1), and
wherein the drive means (6) is a chain of drive cams (61), which from inside or from outside engage in the roller unit (2) and drive the roller unit.

21. The roller element (10) in accordance with claim 20, wherein the drive cams (61) at times are not in engagement with the roller unit (2) and, controlled by a radial cam (67), are brought into engagement with the roller unit (2).

22. A driven roller element, comprising:
a central body (1), as well as
a roller unit (2) extending around the central body (1), which roller unit (2) is arranged as extending on a non-circular continuous track around the central body (1) and movable around the central body (1) through the rolling-off of rollers (3) of the roller unit (2) on an internal side of the roller unit (2), and the rollers (3), on an external side of the roller unit (2) on one side of the central body (1), being provided for rolling-off on a rigid counter body (5),
wherein the roller element (10) comprises drive means, which engage in the roller unit (2) and drive the roller unit (2) relative to the central body (1),
wherein the roller unit (2) comprises means for achieving a minimum spacing between the rollers (3), which prevent that successive rollers (3) come into contact with one another and which enable solely a pushing, not, however, a pulling of a succession of rollers (3), and
wherein the roller unit (2), as means for achieving a minimum spacing between the rollers (3), comprises lateral spacer bodies (84), and the rollers (3) on both sides in an axial direction are respectively supported in a lateral spacer body (84) moving along with it, and the lateral spacer bodies (84) in the moving direction are larger than the roller diameter, by means of which the rollers (3) are spaced apart from one another.

23. A driven roller element, comprising:
a central body (1), as well as
a roller unit (2) extending around the central body (1), which roller unit (2) is arranged as extending on a non-circular continuous track around the central body (1) and movable around the central body (1) through the rolling-off of rollers (3) of the roller unit (2) on an internal side of the roller unit (2), and the rollers (3), on an external side of the roller unit (2) on one side of the central body (1), being provided for rolling-off on a rigid counter body (5),
wherein the roller element (10) comprises drive means, which engage in the roller unit (2) and drive the roller unit (2) relative to the central body (1),
wherein the roller unit (2) comprises a flexible and elastic means for achieving constant spacing between the rollers (3), which connects bearing shafts (31) of the rollers (3) with one another, and
wherein the flexible means is a cage belt (9), which comprises ring-like holding zones (91), in which the rollers (3) are inserted, and link zones (92), which flexibly connect the holding zones (91) to one another, wherein the cage belt (9) is manufactured out of a plastic material as a single part.

24. The roller element (10) in accordance with claim 23, wherein the drive means (62) engages in the cage belt (9) and drives the cage belt.

25. The roller element (10) in accordance with claim 23, wherein the drive means (62) engages in a synchronous belt (38), and the synchronous belt (38) in turn engages in the counter body (5), in order to drive the central body (1) relative to the counter body (5).

26. A driven roller element, comprising:
a central body (1), as well as
a roller unit (2) extending around the central body (1), which roller unit (2) is arranged as extending on a non-circular continuous track around the central body (1) and movable around the central body (1) through the rolling-off of rollers (3) of the roller unit (2) on an internal side of the roller unit (2), and the rollers (3), on an external side of the roller unit (2) on one side of the central body (1), being provided for rolling-off on a rigid counter body (5), wherein the roller element (10) comprises drive means, which engage in the roller unit (2) and drive the roller unit (2) relative to the central body (1), wherein the drive means (6) comprises protruding drive elements (61), which are designed for engaging in corresponding elements of the roller unit (2) and with this for driving the roller unit (2) relative to the central body (1), wherein the protruding drive elements (61) engage between the rollers (3), wherein the rollers (3) comprise grooves (36) extending in the circulating direction, which are designed for receiving the protruding elements (61), and wherein between the roller unit (2) and the counter body (5) a runner belt (24) or a creeper chain is arranged, which extends around the outside of the roller unit (2), and over the whole circumference (23) of the roller unit (2) and sits close to the roller unit.

27. The roller element (10) in accordance with claim 26, wherein the runner belt (24) or the creeper chain comprises a guide bridge (28), which engages in the circumferential guide grooves (36) of the rollers (3).

* * * * *